May 17, 1938. G. S. ALLIN 2,117,784
TANDEM TRUCK VEHICLE
Filed Nov. 17, 1936 2 Sheets-Sheet 2
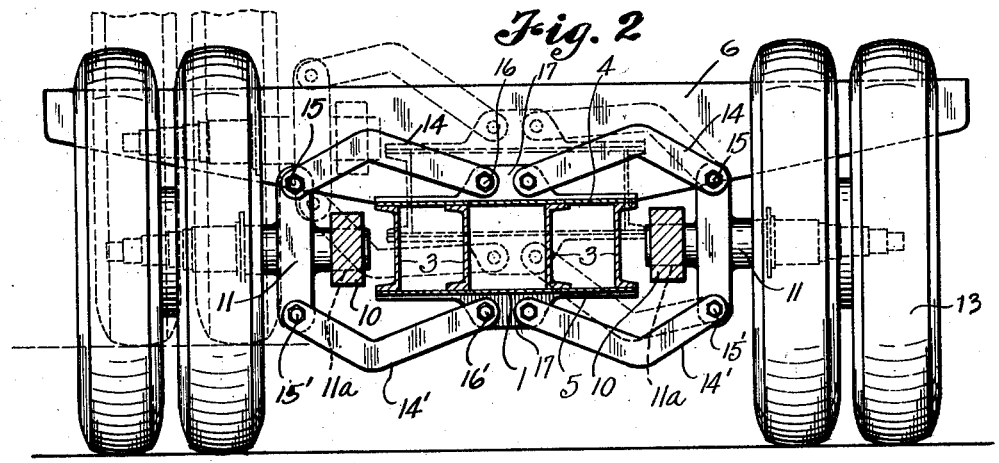
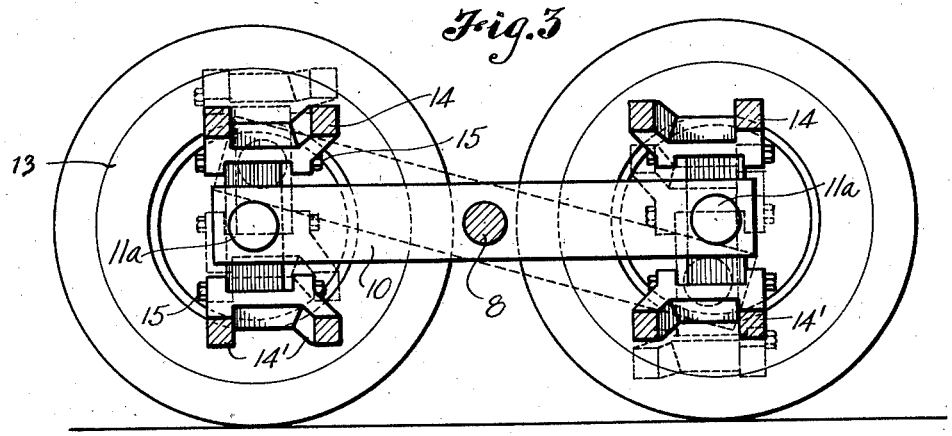
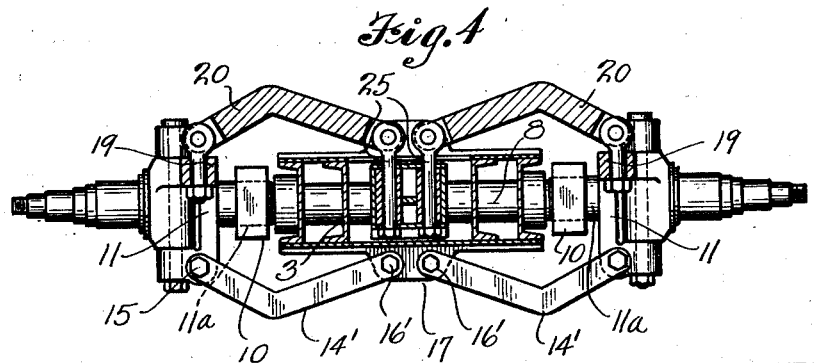
INVENTOR
GEORGE S. ALLIN
BY
Cook & Robinson
ATTORNEY Patented May 17, 1938

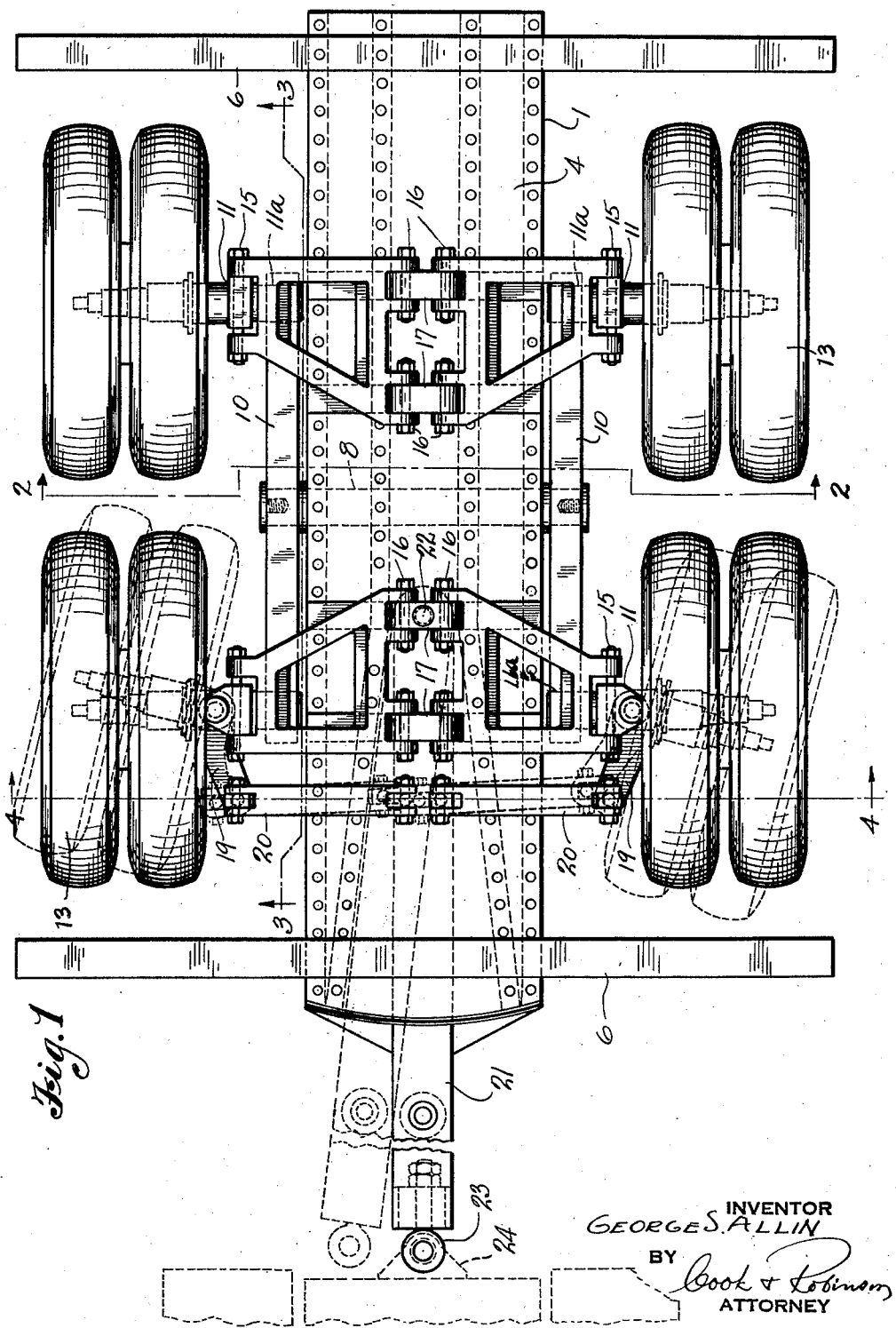

2,117,784

UNITED STATES PATENT OFFICE 2,117,784

TANDEM TRUCK VEHICLE

George S. Allin, Seattle, Wash., assignor to Isaacson Iron Works, Inc., Seattle, Wash.

Application November 17, 1936, Serial No. 111,238

5 Claims. (Cl. 280—81)

This invention relates to improvements in trucks for load-hauling vehicles and it has reference more particularly to an improved form of chassis for vehicles designed especially for the carrying of heavy loads; such, for example, as that type of vehicle illustrated in my co-pending application which was filed on May 3, 1935 under Serial No. 19,578, and in which the present construction was described and illustrated.

It is the principal object of this invention to provide an improved form of construction and to provide a tandem truck arrangement having a compensating action as between trucks at the same side. Also, to provide the vehicle with a draft and balance beam through which steering of the vehicle is obtained.

It is also an object of this invention to provide a construction in which all the wheels are mounted through mechanism providing for independent knee-action.

Other objects reside in the detail of construction, in the combination of parts, and in their mode of operation, as will hereinafter be described.

In accomplishing the various objects of the invention, I have provided the improved detail of construction, the preferred forms of which are illustrated in the accompanying drawings, wherein—

Fig. 1 is a plan, or top view, of a tandem truck chassis embodying the present invention.

Fig. 2 is a cross sectional view of the same, as seen on the line 2—2 in Fig. 1.

Fig. 3 is a sectional detail particularly illustrating the action of tandem trucks at one side, as seen on the line 3—3 in Fig. 1.

Fig. 4 is a cross sectional detail, particularly illustrating the steering wheel connection with the draft beam, as on line 4—4 in Fig. 1.

Referring more in detail to the drawings, in its present preferred form of construction, the chassis, which is designated in its entirety by reference numeral 1, comprises a frame structure made up of a plurality of longitudinally extending, spaced apart channel iron beams 3, which are secured together by plates 4 and 5, which, respectively, overlie and underlie the channel beams and are securely riveted thereto.

At its forward and rearward ends, respectively, the chassis has transverse bunks 6—6 securely fixed in place across the beams 3. The opposite ends of the bunks extend equally beyond the opposite sides of the central frame and are the means of support for whatever load is to be carried by the vehicle.

Approximately at the medial point of the chassis is a supporting cross shaft 8 which extends through the beams 3 transversely of the frame, with its opposite end portions projecting somewhat beyond the sides of the frame to operate as supporting trunnions on which truck mounting beams 10—10, that extend in the longitudinal direction of the vehicle, are pivotally mounted. The beams 10—10 are of equal length and are pivoted at their centers on the ends of cross shaft 8 and are adapted to oscillate in parallel, vertical planes. Pivotally mounted at the opposite ends of each of these beams are wheel mounting knuckles 11, each provided with a horizontal, outwardly extending spindle 12, on which spindles ground wheels or set of wheels 13 are mounted for supporting the vehicle.

By reference to Fig. 1, it will be observed that the knuckles 11 have journals 11a at their inner sides, revolvable in bearings provided therefor in the ends of the beams 10. Also, it is observed that, associated with each knuckle is a pair of hinge brackets 14—14' with ends pivotally connected by pivot pins 15—15', respectively, with the upper and lower ends of the knuckles and with their other ends pivotally connected by pins 16—16' to lugs 17 on top and bottom sides of the chassis, thereby providing a tandem wheel arrangement in which the wheels have knee-action compensation through the pivotal action of the beams 10—10, and wherein the beams 10 are held against all possible lateral strain.

It will be apparent that the tandem wheels at one side are movable vertically, up or down, independent of those at the other side and that the wheels in tandem at each side have a relatively compensated action through the pivoting of their mounting beams 10.

The paired hinge brackets 14—14' for each knuckle have a parallel link action whereby the wheel spindles which they support are always maintained in normal horizontal position in the upward or downward knee-action movements. The knuckle mounting journals 11a are rotatable and also are axially slidable in their bearings in the ends of the beams 10. Also, the knuckles have the necessary clearance between the hinge lugs and the ends of the brackets 14 to provide for the slight forward and rearward sliding on the pivot pins 15—15' that is incident to the oscillating action of the beams 10.

The spindles for the forward sets of wheels are pivotally mounted in their knuckles by vertical pins 18 as shown in Fig. 4, and they have steering arms 19 extended forwardly therefrom and operatively connected by links 20 with a balance and draft bar, through the mediacy of which the vehicle is drawn. This bar 21 has its rearward end pivotally attached to the chassis frame, at a point forward of the cross shaft 8, by means of a vertical pin 22 with the forward end of the bar extended forwardly of the frame. This bar is equipped at its forward end with a supporting and hauling connection designated at 23 in Fig. 1, adapted for connection with a tractor draft connection designated as 24. The draft bar 21 is horizontally swingable about its pivot pin connection 22 toward opposite sides of the vehicle within a limited angle between the longitudinal frame beams as designated in dotted lines in Fig. 1, and this movement effects the steering action of the forward wheels 13.

The connecting links 20 have universal pivotal connections at their outer ends with the steering arms 19, and they likewise have universal pivotal connections at their inner ends with pins or bolts 25 extended upwardly through the draft bar, thereby to accommodate themselves to the knee-action movements of the steering wheels.

It will be observed, also, by reference to Fig. 1 that these latter pivotal connections are aligned with the line of pivots of the inner ends of the knuckle mounting links, thereby providing that the knee-action movement will not cause any change in steering direction.

With the chassis so constructed, and assuming that a load is being hauled thereon and supported by the cross bunks, the vehicle would be supported in balance by reason of the connecting draw bar having a supporting connection with the chassis with reference to vertical tilting movements of the latter. It is evident, also, that if one of the sets of wheels should strike an obstruction, this set will be allowed to lift without causing any material tilting of the vehicle by reason of the compensating action provided for through the pivoted beams 10.

Having thus described my invention, what I claim as new therein and desire to secure by Letters Patent is:

1. A truck chassis comprising a rigid load carrying frame, trunnions at opposite sides of the frame, supporting levers extending lengthwise of the frame and centrally pivoted on the trunnions for oscillating in vertical planes, a knuckle at each end of each lever; each knuckle comprising a wheel mounting spindle and a trunnion pivotally and slidably mounted in the end of the lever, ground wheels mounted by said spindles of the knuckles and a pair of hinge links for each knuckle with inner ends hingedly attached to the frame and outer ends hingedly attached to the knuckle to provide a parallel link mounting for each of the knuckles.

2. A construction as recited in claim 1 wherein the hinge links for each knuckle have hinge connections permitting relative movement of the knuckle and links in the longitudinal direction of the knuckle mounting levers.

3. A truck chassis comprising a load carrying frame, a supporting cross shaft, levers at opposite sides of the frame parallel therewith and centrally pivoted on the ends of said cross shaft, a wheel mounting knuckle at each end of each lever, each knuckle comprising a mounting trunnion pivoted in said lever and adapted for inward and outward sliding movement therein, and a wheel mounting spindle, ground wheels mounted on said spindles and a pair of hinge brackets for each knuckle extending in a direction transversely of the frame, with inner ends hingedly fixed to the frame on vertically spaced axes, and with their outer ends hingedly fixed to the knuckle on vertically spaced axes.

4. A truck chassis, comprising a load carrying frame, a draft and balance bar pivotally fixed to the frame for horizontal swinging therein, levers at opposite sides of the frame lengthwise thereof and pivoted on the frame between their ends for oscillation in vertical planes, knuckles mounted by said levers at their front and rear ends, each knuckle comprising a mounting trunnion pivotally and slidably mounted in the lever, and a spindle, ground wheels on said spindles; said spindles of the knuckles for the front wheels being pivoted for steering and having steering arms operatively connecting with said draft bar for steering thereby and brackets hingedly attached to the frame and to the knuckles to retain them in operative position.

5. A truck chassis comprising a load carrying frame, a supporting cross shaft, a draft and balance bar pivotally fixed to the frame and adapted for horizontal movement relative thereto, levers at opposite sides of the frame, parallel thereto and centrally pivoted on the ends of the cross shaft for vertical oscillation, a knuckle mounted at the end of each lever; each knuckle comprising a mounting trunnion pivoted on the lever and slidable inwardly and outwardly therein, a wheel mounting spindle on the knuckle, ground wheels mounted on the spindles, a pair of vertically spaced hinge brackets for each knuckle, having inner ends hingedly attached to the frame, and outer ends hingedly attached to the knuckle for movement of the latter vertically relative to the frame; said spindles for the front wheels being pivoted for steering and having steering arms, and links connecting said arms with the draft bar.

GEORGE S. ALLIN.